US 8,614,733 B2

(12) United States Patent
Kato

(10) Patent No.: US 8,614,733 B2
(45) Date of Patent: Dec. 24, 2013

(54) APPARATUS, SYSTEM, AND METHOD OF PREVENTING LEAKAGE OF INFORMATION

(75) Inventor: Yoshinaga Kato, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 397 days.

(21) Appl. No.: 13/034,259

(22) Filed: Feb. 24, 2011

(65) Prior Publication Data

US 2011/0205331 A1 Aug. 25, 2011

(30) Foreign Application Priority Data

Feb. 25, 2010 (JP) .................................. 2010-039593
Jan. 14, 2011 (JP) .................................. 2011-006119

(51) Int. Cl.
*H04N 7/14* (2006.01)
*H04M 3/42* (2006.01)
*G06F 17/30* (2006.01)
*H04R 3/00* (2006.01)

(52) U.S. Cl.
USPC ............... 348/14.08; 348/14.01; 348/14.05; 370/216; 370/352; 379/202.01; 379/220.01; 381/56; 381/92; 381/119; 381/306; 455/416; 600/559; 705/7.38; 707/770; 709/204; 709/206

(58) Field of Classification Search
USPC ............ 348/14.01, 14.05, 14.08; 381/56, 92, 381/119, 306; 455/416; 600/559; 707/770; 370/216, 352; 379/202.01, 220.01; 705/7.38; 709/204, 206
See application file for complete search history.

(56) References Cited

U.S. PATENT DOCUMENTS

| | | | | |
|---|---|---|---|---|
| 4,995,071 A | * | 2/1991 | Weber et al. | 348/14.08 |
| 6,078,658 A | * | 6/2000 | Yunoki | 379/220.01 |
| 6,587,870 B2 | * | 7/2003 | Takagi et al. | 709/204 |
| 6,606,111 B1 | * | 8/2003 | Kondo et al. | 348/14.01 |
| 7,164,435 B2 | * | 1/2007 | Wang et al. | 348/14.08 |
| 7,184,559 B2 | * | 2/2007 | Jouppi | 381/92 |
| 7,227,566 B2 | * | 6/2007 | Abe et al. | 348/14.05 |
| 7,260,226 B1 | * | 8/2007 | Miura et al. | 381/56 |
| 7,266,368 B2 | * | 9/2007 | Yamauchi et al. | 455/416 |
| 7,318,198 B2 | | 1/2008 | Sakayori et al. | |
| 7,508,822 B2 | * | 3/2009 | Tanigawa et al. | 370/352 |
| 7,739,221 B2 | * | 6/2010 | Lawler et al. | 707/770 |
| 8,170,191 B2 | * | 5/2012 | Potekhin et al. | 379/202.01 |
| 8,287,462 B2 | * | 10/2012 | Givens et al. | 600/559 |
| 2003/0036909 A1 | | 2/2003 | Kato | |

(Continued)

FOREIGN PATENT DOCUMENTS

JP 2000-99076 A 4/2000
JP 2004-351622 A 12/2004

OTHER PUBLICATIONS

Tetsuya Muroi et al., "Isolated Spoken Word Recognition by Duration-Based State Transition Models", Journal of the Institute of Electronics, Information and Communication Engineers, vol. J72-D-II, Nov. 1989, pp. 1769-1777 (with an English Translation).

(Continued)

*Primary Examiner* — Gerald Gauthier
(74) *Attorney, Agent, or Firm* — Oblon, Spivak, McClelland, Maier & Neustadt, L.L.P.

(57) ABSTRACT

When a communication terminal determines that restriction processing is to be applied based on a sound input through the communication terminal or a user instruction, the communication terminal restricts output of conference information received from a counterpart terminal.

15 Claims, 8 Drawing Sheets

(56) References Cited

U.S. PATENT DOCUMENTS

| | | | |
|---|---|---|---|
| 2005/0130638 A1* | 6/2005 | Schrader | 455/416 |
| 2008/0159510 A1* | 7/2008 | Julien et al. | 379/202.01 |
| 2009/0252029 A1* | 10/2009 | Daetz et al. | 370/216 |
| 2009/0268713 A1* | 10/2009 | Ottur et al. | 370/352 |
| 2011/0103624 A1* | 5/2011 | Ferren | 381/306 |
| 2011/0173270 A1* | 7/2011 | Uchida et al. | 709/206 |
| 2011/0205331 A1* | 8/2011 | Kato | 348/14.08 |
| 2011/0295655 A1* | 12/2011 | Tsuji et al. | 705/7.38 |
| 2012/0321105 A1* | 12/2012 | McGrath | 381/119 |

OTHER PUBLICATIONS

L. Rabiner et al., "Chapter 6 Theory and Realization Method of Hidden Markov Model", Fundamentals of Speech Recognition, NTT Advance Technology, 1995, pp. 124-129 (with an English Translation).

* cited by examiner

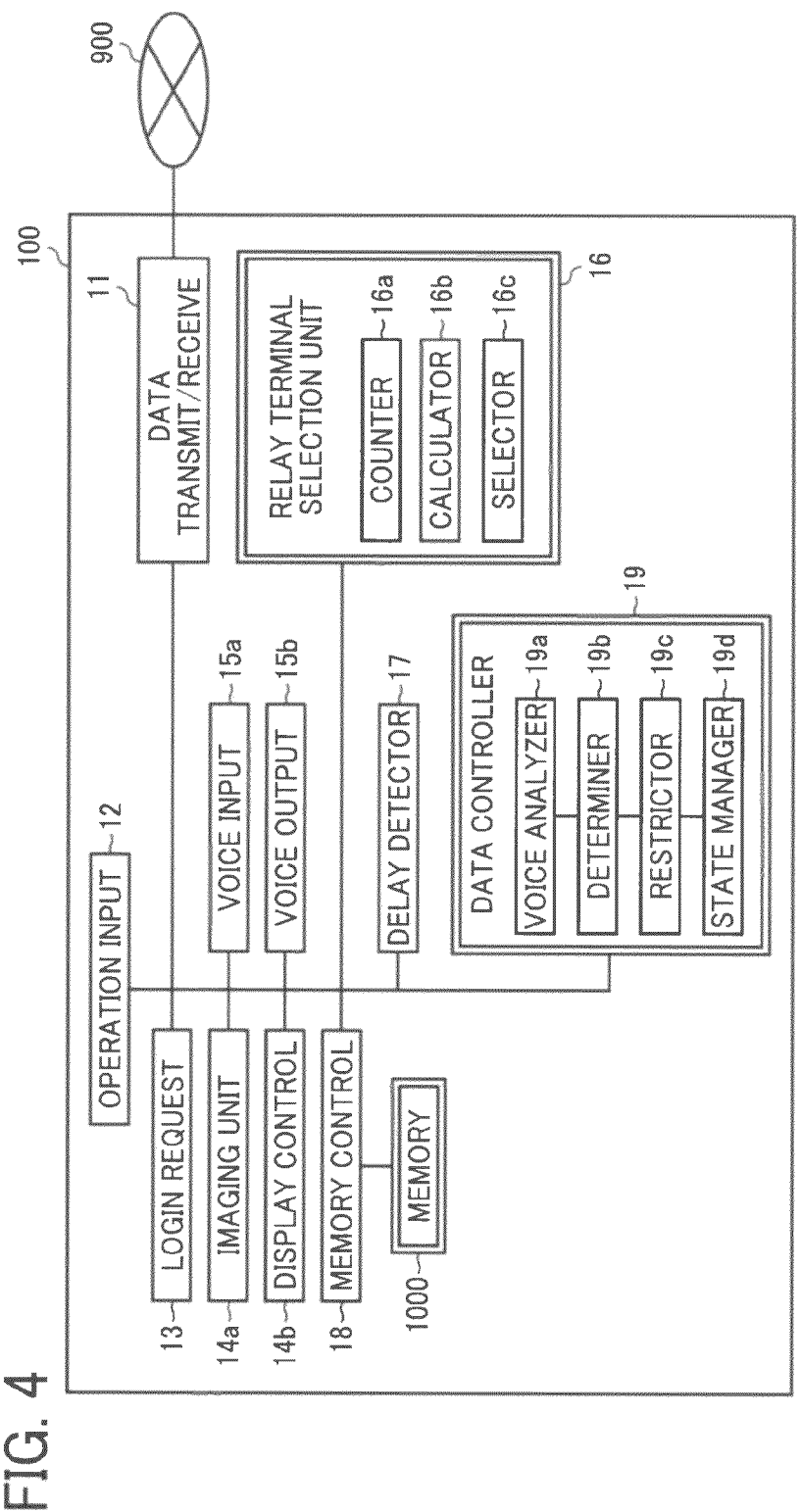

FIG. 8

| NO. | SOUND MODEL |
|---|---|
| S1 | HMM S1 |
| S2 | HMM S2 |
| ... | ... |
| Sn | HMM Sn |

FIG. 9

| NO. | SOUND MODEL |
|---|---|
| N1 | HMM N1 |
| N2 | HMM N2 |
| ... | ... |
| Nm | HMM Nm |

FIG. 10

| STATE NO. | PROBABILITY DENSITY FUNCTION |
|---|---|
| S1 | $b_{s1}$ |
| S2 | $b_{s2}$ |
| ... | ... |
| Sn | $b_{sn}$ |

FIG. 11

| STATE NO. | PROBABILITY DENSITY FUNCTION |
|---|---|
| N1 | $b_{N1}$ |
| N2 | $b_{N2}$ |
| ... | ... |
| Nm | $b_{Nm}$ |

APPARATUS, SYSTEM, AND METHOD OF PREVENTING LEAKAGE OF INFORMATION

CROSS-REFERENCE TO RELATED APPLICATIONS

This patent application is based on and claims priority under 35 U.S.C. §119 to Japanese Patent Application Nos. 2010-039593, filed on Feb. 25, 2010, and 2011-006119, filed on Jan. 14, 2011, in the Japanese Patent Office, the entire disclosure of which is hereby incorporated herein by reference.

FIELD OF THE INVENTION

The present invention generally relates to an apparatus, system, and method of exchanging data among a plurality of remotely located sites to have videoconference, and more specifically to an apparatus, system, and method of exchanging data among a plurality of remotely located sites with improved security.

BACKGROUND

The recent videoconference systems allow exchange of data among a plurality of terminals through a communication network such as the Internet. The terminal sends image data and/or voice data of a user who operates the terminal, to a counterpart terminal for output through a display or a speaker of the counterpart terminal.

Further, the terminals of the recent videoconference systems may be made smaller in size such that the user may bring the terminal to any room other than the conference room to have videoconference with one or more users using the terminal. For example, the user may bring the terminal to his or her own desk or room to have videoconference using the terminal. In another example, the user may bring the terminal to his or her home to have videoconference using the terminal.

While the terminal, which may be portable, is convenient for the user, this may create the security problem as any person may be able to walk in to the place where the terminal is located to obtain information that is shared among the users having videoconference. For example, a person other than the participants of videoconference may be able to see image data being displayed through the terminal, or hear voice data being output through the terminal.

SUMMARY

Example embodiments of the present invention include an apparatus, method, system, computer program and product each capable of determining whether restriction processing is to be applied at a communication terminal based on a sound input through the communication terminal or a user instruction, and restricting output of conference information received from a counterpart terminal at the communication terminal.

Example embodiments of the present invention include an apparatus, method, system, computer program and product each capable of determining whether restriction processing is to be applied at a communication terminal based on a sound input through the communication terminal or a user instruction, restricting output of conference information received from a counterpart terminal at the communication terminal, and sending a message indicating that restriction processing is applied at the communication terminal to the counterpart terminal.

In addition to the above-described example embodiments, the present invention may be practiced in various other ways.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 4 is a schematic block diagram illustrating a functional structure of the terminal of FIG. 1;

FIG. 5A is an illustration for explaining a data structure of an example message generated by the terminal of FIG. 1;

FIG. 5B is an illustration for explaining a data structure of an example message generated by the terminal of FIG. 1;

FIG. 8 is an illustration for explaining an example data structure of a sound model table storing one or more human voice models, according to an example embodiment of the present invention;

FIG. 9 is an illustration for explaining an example data structure of a sound model table storing one or more noise models, according to an example embodiment of the present invention;

FIG. 10 is an illustration for explaining an example data structure of a sound model table storing one or more human voice models, according to an example embodiment of the present invention;

FIG. 11 is an illustration for explaining an example data structure of a sound model table storing one or more noise models, according to an example embodiment of the present invention;

Figure 1:
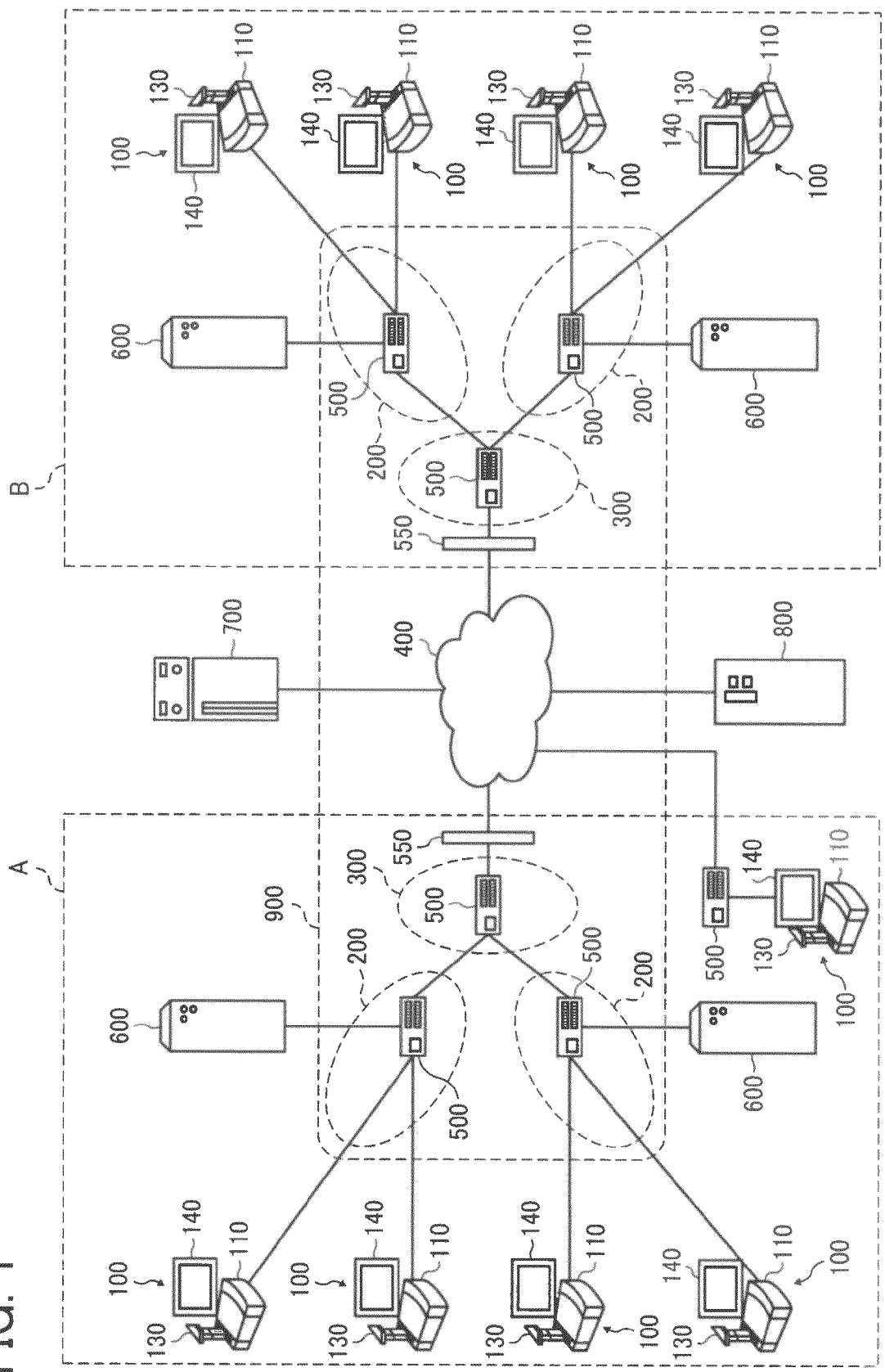
FIG. 1 is an illustration for explaining a configuration of a communication system, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

FIG. 1 illustrates a communication system, which allows exchange of data among a plurality of terminals that may be remotely located from one another to have videoconference among users of the plurality of transmission terminals.

The communication system of FIG. 1 includes a plurality of terminals 100, which are connected with one another through a communication network 900 to transmit or receive various data such as image data and voice data among the plurality of terminals 100. Any number of the plurality of terminals 100 may be collectively or each referred to as the terminal 100. The terminal 100 that transmits data to another terminal 100 to carry out videoconference is referred to as the request terminal 100. The terminal 100 that receives data from another terminal 100 to carry out videoconference is referred to as the counterpart terminal 100. For example, the request terminal 100 includes any terminal 100 that requests another terminal 100 to start videoconference, and the counterpart terminal 100 includes any terminal 100 that is requested by the request terminal 100 to start videoconference.

The communication network 900 includes a plurality of local area networks (LAN) 200, a plurality of leased lines 300, and the Internet 400. Further, in this example, it is assumed that any desired number of terminals 100 is located in an area A, and any desired number of terminals 100 is located in an area B.

Further, in this example, it is assumed that the LAN 200 in the area A connects the terminals 100 that are located at different company's offices or buildings to create a local area network such that at least the terminals 100 located in the area A is communicable through the LAN 200. Similarly, it is assumed that the LAN 200 in the area B connects the terminals 100 that are located at different offices or buildings to create a local area network such that at least the terminals 100 located in the area B is communicable through the LAN 200. The LAN 200 in the area A is further connected to the LAN 200 in the area B through the leased line 300 and the Internet 400.

For example, it is assumed that the area A is any place in Japan, and the area B is any place in the United States. In such case, one of the LANs 200 in the area A connects the terminals 100 located in offices of Tokyo, and one of the LANs 200 in the area B connects the terminals 100 located in offices of New York. Further, the terminals 100 located in Tokyo and the terminals 100 located in New York are communicable through the leased line 300 and the Internet 400.

Further, as illustrated in FIG. 1, the LANs 200 and the leased lines 300 each include a router 500. The terminal 100 is connected to the Internet 400 through the router 500. In operation, the router 500 selects an optimum route for transmitting various data such as image data and voice data among a plurality of terminals 100 through the communication network 900 to allow communication among the plurality of terminals 100.

Still referring to FIG. 1, the communication network 900 further includes a gateway 550 between the leased line 300 and the Internet 400 for each of the areas A and B. The gateway 550 functions as a communication device that connects network of different protocols. The communication network 900 may include any desired number or type of gateway.

The communication system of FIG. 1 further includes a plurality of relay terminals 600, a communication management system 700, and a program providing system 800.

The relay terminal 600 may be each provided at the LAN 200. In operation, the relay terminal 600 relays various data such as image data and voice data from one terminal 100 and another terminal 100 to carry out videoconference between these two terminals 100. Further, in this example, when the relay terminal 600 determines that transmission of data is delayed during videoconference, the relay terminal 600 changes resolution of image data to be transmitted by the relay terminal 600 so as to reduce the data size of the image data for transmission, and sends the image data to the terminal 100. With this function, the image data is transmitted more seamlessly, thus improving the real-time characteristics of videoconference.

The communication management system 700, which is connected to the Internet 400, centrally manages various devices in the communication system of FIG. 1 including the terminal 100 and the relay terminal 600.

For example, the communication management system 700 manages communication that is carried out by the terminal 100 and/or the relay terminal 600, registration of the terminal 100 into the communication system of FIG. 1, identification information of the terminal 100 such as the ID of the terminal 100 or the IP address of the terminal 100, charge fee that is charged in association with the usage of the communication system of FIG. 1, a response received from the counterpart terminal 100 in response to a communication request sent by the request terminal 100, the operation state of the terminal 100, the selection of the relay terminal 600 for determining the communication route that is most suitable, etc.

In one example, the communication management system 700 notifies the request terminal 100 that requests for videoconference, regarding the operation state of a candidate counterpart terminal 100 that the request terminal 100 may desire to have videoconference with. The operation state of the terminal 100 includes, but not limited to, the state indicating whether the terminal 100 is connected or disconnected, the state indicating whether the terminal 100 is logged in or not, the state indicating whether the terminal 100 is having videoconference or not, and the state indicating whether the terminal 100 is applied with restriction processing to restrict information to be output through the terminal 100.

The program providing system 800, which is connected to the Internet 400, includes a storage unit such as a hard disk device that stores various programs. In this example, the program providing system 800 stores in the storage unit various programs, which cause the communication system of FIG. 1 to perform various operations to carryout videoconference. Any part of the programs may be sent through the communication network 900 to another device.

More specifically, in this example, the program providing system 800 stores a terminal management program, which causes the terminal 100 to perform various operations or functions as described below to carry out videoconference including operation or function to apply restriction processing during videoconference. Further, the program providing system 800 stores a relay management program, which causes the relay terminal 600 to perform various operation or functions to carry out videoconference including operation or function to select an optimum route that is most suitable for transmitting image data or voice data. Further, the program providing system 800 stores a communication management program, which causes the communication management system 700 to perform various operations or functions to carry out videoconference including operation or function to manage various data regarding one or more devices in the communication system.

The terminal 100 includes a body 110, a camera 130, and a display 140.

In this example, any one of the terminals 100 may be provided at home to allow a user to work at home while providing access to the communication network 900 through the terminal 100. In such case, the terminal 100 may communicate with another terminal 100 through the Internet 400 via the leased line 300.

Assuming that the terminal 100 is operated by the user who works at home, the terminal 100 may be connected to the Internet 400 through the leased line 300 as described above for improved security. Alternatively, the terminal 100 may be connected to the communication network 900 using virtual private network (VPN) to manage data to be transmitted with improved security while still using a public infrastructure such as the Internet 400, even without communicating through the leased line 300.

In one example, the terminal 100 that is located at home of the user may be additionally provided with software that encrypts or decrypts data to be transmitted or received through the communication network 900 using VPN. Alternatively, the communication network 900, which includes the Internet 400, may encrypt data using IPsec (Security Architecture for Internet Protocol) or PPTP (Point to Point Tunneling Protocol).

Alternatively or additionally, the communication system of FIG. 1 may be provided with a function of authenticating the terminal 100 or data that is transmitted by the terminal 100, thus improving the security. For example, the communication system of FIG. 1 may be additionally provided with an authentication server that authenticates the user at the terminal 100 or the terminal 100 to allow terminal 100 to log in the communication system only when the terminal 100 is authenticated.

Additionally or alternatively, the gateway 550 may be additionally provided with a function of authenticating the user of the terminal 100 or the terminal 100. By requiring the terminal 100 to connect to the communication network 900 through the gateway 550, the security of the communication system of FIG. 1 is further improved.

Further, in this example, the terminals 100 may communicate with one another in various ways. For example, at least two different terminals 100 that are located at different rooms in the same office, or at least two different terminals 100 that are located at different offices that are remotely located from one another, may communicate with one another. In another example, at least two different terminals 100 that are located in the same room may communicate with one another. In another example, one terminal 100 that is located indoor and another terminal 100 that is located outdoor, or at least two different terminals 100 that are both located outdoor, may communicate with one another. When the terminal 100 is located outdoor, the terminal 100 communicates with the other terminal 100 through a wireless network such as a wireless network designed for a mobile phone. Further, any number of users may participate videoconference as long as the number of users is greater than one.

Further, any information may be transmitted from one terminal 100 to another terminal 100 including, for example, image data, voice data, and image data and voice data. For example, in case of transmitting only the image data, a voice of the user who participates videoconference may be displayed in the form of text. Further, any desired information may be transmitted as image data including, for example, a sample of goods, a material for distribution such as handouts, and a screen shot of presentation material. By providing these types of information that are usually distributed to meeting attendants through transmission of image data, the users who participate the videoconference are able to carry out conversation as they were actually having face-to-face meetings.

Figure 2:
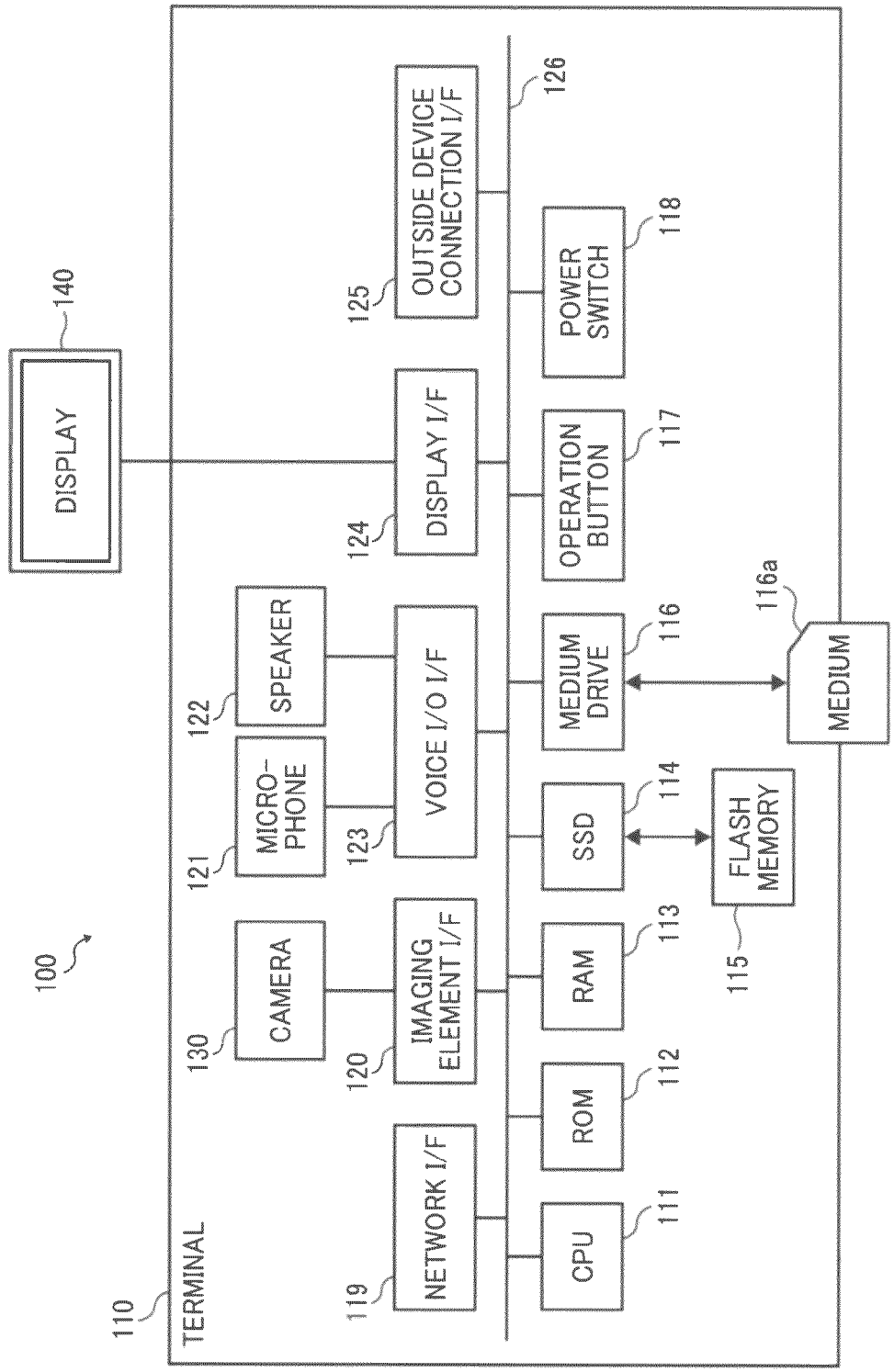
FIG. 2 is a schematic block diagram illustrating a hardware structure of a terminal included in the communication system of FIG. 1.

FIG. 2 illustrates a hardware structure of the terminal 100 according to an example embodiment of the present invention. The terminal 100 of FIG. 2 includes a central processing unit (CPU) 111, a read only memory (ROM) 112, a random access memory (RAM) 113, a solid state drive (SSD) 114, a flash memory 115, a medium drive 116, an operation button 117, a power switch 118, a network interface (I/F) 119, an imaging element interface (I/F) 120, the camera 130, a microphone 121, a speaker 122, a voice input/output interface (I/O I/F) 123, a display interface (I/F) 124, and an outside device connection interface (I/F) 125, which are electrically connected through a bus 126 such as an address bus or data bus.

The CPU 111 controls entire operation of the terminal 100. The ROM 112 stores therein a control program for execution by the CPU 111, such as an initial program loader (IPL). The RAM 113, which functions as a work area of the CPU 111, stores various control values to be referred to by the CPU 111. The flash memory 115 stores therein various data such as the terminal control program, image data, or voice data. The SSD 114 controls reading or writing of various data with respect to the flash memory 115 under control of the CPU 111. The medium drive 116 controls reading or writing of various data with respect to a removable recording medium 116*a* such as a flash memory. The operation button 117 allows the user to input a user instruction, for example, by allowing the user to select a communication destination such as the counterpart terminal 100. The power switch 118 allows the user to switch on or off the power of the terminal 100. The network I/F 119 allows the terminal 100 to transmit or receive data through the communication network 900.

The camera 130 takes an image of an object to obtain image data under control of the CPU 111. The imaging element I/F 120 controls operation of the camera 130. The microphone 121 catches sounds such as voice of the user and/or noise. The speaker 122 outputs sounds such as sounds generated based on voice. The voice I/O I/F 123 controls input or output of sound signals such as voice signals with respect to the microphone 121 and the speaker 122 under control of the CPU 111. The display I/F 124 transmits image data to the display 140 under control of the CPU 111. The display 140 displays various data on its screen such as the image of the user received from the counterpart terminal 100. The outside device connection I/F 125 controls connection of the terminal 100 to various types of outside device.

In this example, the display 140 is externally provided, while the camera 130, the microphone 121, and the speaker 122 are each incorporated within the body 110 of the terminal 100. Alternatively, the body 110 may be connected to any one of the external camera, external microphone, and external speaker through the outside device connection I/F 125.

In alternative to the flash memory 115, any nonvolatile memory that is readable and writable under control of the CUP 111 may be used such as Electrically Erasable and Programmable ROM (EEPROM).

The camera 130 includes a plurality of devices such as a lens system, and a solid-state image sensing device that photo-electrically converts a light to generate an image of an object. For example, the solid-state image sensing device includes a complementary metal oxide semiconductor (CMOS) or a charge coupled device (CCD). In this example, the image captured by the camera 130 may be a still image or a moving image. Further, the image may be output in a format compatible to USB standards.

Figure 3:
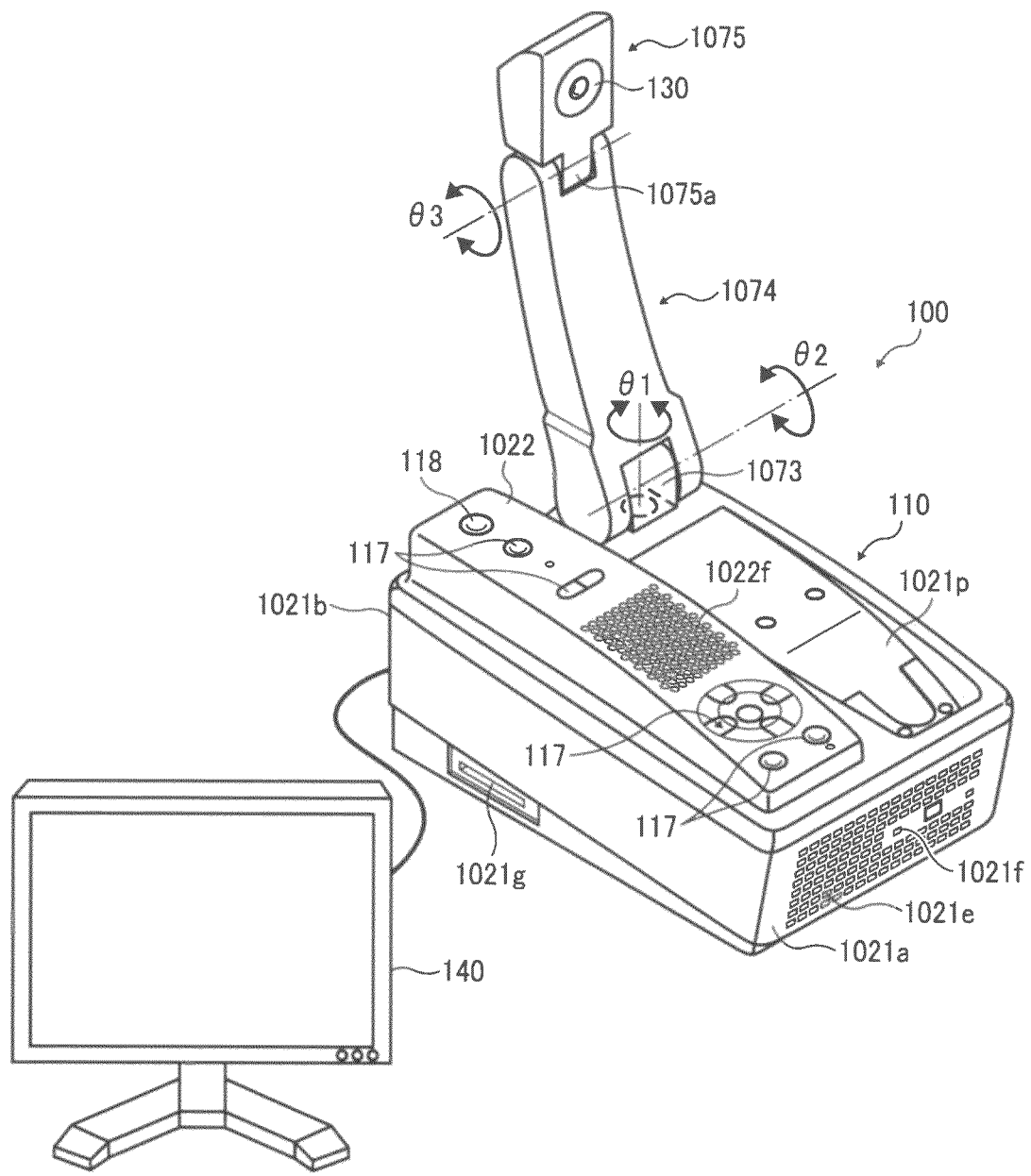
FIG. 3 is a perspective view illustrating the outer appearance of the terminal of FIG. 1.

FIG. 3 is a perspective view illustrating the outer appearance of the terminal 100 of the communication system of FIG. 1, according to an example embodiment of the present invention.

As illustrated in FIG. 3, the terminal 100 includes the body 110, an arm 1074, and a camera housing 1075. The body 1021 includes a front side wall 1021a having a plurality of air intake holes 1021e that are formed over the nearly entire surface of the front side wall 1021a. The body 110 further includes a back side wall 1021b having a plurality of exhaust holes over the nearly entire surface of the back side wall 1021b. When a cooling fan that is provided within the body 110 is driven, air flows in through the intake holes 1021e of the front side wall 1021a and out through the exhaust holes of the back side wall 1021b.

The front side wall 1021a is further provided with a sound pickup hole 1021f, which is formed at a central portion of the front side wall 1021a. Through the sound pickup hole 1021f, the microphone 121 (FIG. 2) of the terminal 100 is able to catch sounds such as human voice or any sound including noise.

The body 110 has an operation panel 1022, which is provided at the left portion when viewed from the top. The operation panel 1022 includes a plurality of operation buttons 117 ("the operation button 117"), the power switch 118, and a plurality of sound output holes 1022f. Through the sound output holes 1022f, the speaker 122 of the terminal 100 is able to output sounds such as sounds generated based on human voice. The body 110 further includes a holder 1021p, which is provided at the right portion when viewed from the top. The holder 1021p, which has a concave shape, accommodates therein the arm 1074 and the camera housing 1075.

The arm 1074 is fixed to the body 110 via a torque hinge 1073. With the torque hinge 1073, the arm 1074 can be rotated in all directions of up, down, right, and left, with respect to the top surface of the body 110, while making a pan angle θ1 that ranges from −180 degrees to +180 degrees and a tilt angle θ2 that ranges from 0 to 90 degrees with the top surface of the body 110. When the arm 1074 is tilted at a relative tilt angle of 45 degrees, a click sound is generated.

The camera housing 1075 incorporates therein the camera 130 that takes an image of an object. The object may be a part of a user or a room where the terminal 100 is located. The camera housing 1075 is fixed to the arm 1074 through a torque hinge 1075a. With the torque hinge 1075a, the camera housing 1075 can be rotated with respect to the arm 1074, while making a tilt angle θ3 that ranges from about +100 degrees to −90 degrees in the direction toward the front side wall 1021a of the body 1021. The camera housing 1075 makes a tilt angle of 0 degree with respect to the arm 1074 when the camera housing 1075 and the arm 1074 are on the same plane.

The body 110 further includes a connection port 1021g that is formed on a lower side surface of the body 1021. The connection port 1021g is a hardware interface (I/F) that connects the terminal 100 with a cable terminal of any desired outside device such as an outside camera, microphone, speaker, etc.

Further, as illustrated in FIG. 3, the terminal 100 is connected to the display 140 through a cable.

FIG. 4 illustrates a functional structure of the terminal 100 according to an example embodiment of the present invention. The terminal 100 includes a data transmit/receive 11, an operation input 12, a login request 13, an imaging unit 14a, a display control 14b, a voice input 15a, a voice output 15b, a relay terminal selection unit 16, a delay detector 17, a memory control 18, and a data controller 19.

These units that are shown in FIG. 4 correspond to a plurality of functions or functional modules, which are executed according to an instruction of the CPU 111 (FIG. 2) that is generated according to the terminal control program being loaded from the ROM 112 onto the RAM 113.

The terminal 100 further includes a memory 1000, which may be implemented by the flash memory 115 (FIG. 2) that operates under control of the SSD 114.

The operations or functions of the data transmit/receive 11 of the terminal 100 of FIG. 4 are performed by the network I/F 119 of FIG. 2 according to an instruction received from the CPU 111. The data transmit/receive 11 transmits or receives various data or information to or from another terminal 100, device, or system, through the communication network 900.

The operations or functions of the operation input 12 of the terminal 100 of FIG. 4 are performed by the operation button 117 and the power switch 118 (FIG. 2) according to an instruction received from the CPU 111. The operation input 12 receives a user instruction input by the user through the operation button 117 or the power switch 118. For example, when the user selects "ON" using the power switch 118, the operation input 12 receives a user instruction for turning the power on, and causes the terminal 100 to turn on the power. In another example, when the user selects a specific counterpart terminal 100 to start communication with through the operation button 117, selection of the specific counterpart terminal 100 is transmitted to the communication management system 700.

Further, as described below, the operation input 12 receives a user instruction for starting restriction processing to restrict information to be output through the terminal 100 during videoconference, through the operation button 117. The operation input 12 further receives a user instruction for stopping the process of performing restriction processing at the terminal 100, through the operation button 117.

The operations or functions of the login request 13 are performed according to an instruction received from the CPU 111 of FIG. 2. When the power of the terminal 100 is turned on, the login request 13 automatically causes the data transmit/receive 11 to send login request information that requests the login process, and a current IP address of the terminal 100, to the communication management system 700 through the communication network 900.

The operations or functions of the imaging unit 14a of the terminal 100 of FIG. 4 are performed by the camera 130 and the imaging element I/F 120 according to an instruction received from the CPU 111. The imaging unit 14a takes an image of an object to output image data of the object.

The operations or functions of the display control 14b of the terminal 100 of FIG. 4 are performed by the display IN 124 according to an instruction received from the CPU 111. The display control 14b controls transmit of image data to the display 140.

The operations or functions of the voice input 15a of the terminal 100 of FIG. 4 are performed by the voice input/ output I/F 123 according to an instruction received from the CPU 111. The terminal 100 collects sounds including voice of the user at the terminal 100 that is input through the microphone 121, and inputs the collected sounds to the voice input 15a. The voice input 15a converts the collected sounds, which may be collected in the form of signal such as voice signal, to data such as voice data, and outputs the data to another functional module for further processing.

The operations or functions of the voice output 15b of the terminal 100 of FIG. 4 are performed by the voice input/output I/F 123 according to an instruction received from the CPU 111. The terminal 100 receives data such as voice data from another terminal 100 at the data transmit/receive 11, and inputs the received data to the voice output 15b. The voice output 15b converts the received data such as voice data to a signal such as a voice signal, and outputs the voice signal through the speaker 122.

The relay terminal selection unit 16 selects one of the relay terminals 600 that is suitable for communication to start videoconference. More specifically, according to an instruction received from the CPU 111 (FIG. 2), the relay terminal selection unit 16 performs selection of the relay terminal 30 using a counter 16a, a calculator 16b, and a selector 16c.

The counter 16a obtains date and time information indicating the date and time at which the data transmit/receive 11 of the terminal 100 receives preparatory transmit information when the preparatory transmit information is transmitted from another terminal 100. The calculator 16b calculates a time period T between the time when the preparatory information is transmitted by another terminal 100 and the time when the preparatory information is received at the terminal 100, based on the difference between the time and date information obtained by the counter 16a and time and date information included in the preparatory transmit information. The selector 16c selects one of the relay terminals 30 having the minimum value of the time period T calculated by the calculator 16b. The relay terminal selection unit 16 obtains or calculates the above-described time values, for example, in milliseconds.

The delay detector 17 detects a delay time ms indicating a time period in which contents data such as image data or voice data sent through the relay terminal 600 from another terminal 100 is delayed, according to an instruction received from the CPU 111 (FIG. 2).

The memory control 18 is implemented by the SSD 114 (FIG. 2) according to an instruction received from the CPU 111. The memory control 18 stores various data in the memory 1000, or read out various data from the memory 1000. The memory 1000 stores therein various data such as terminal identification (ID) information for identifying the terminal 100, a password for authenticating the terminal 100 or a user at the terminal 100, and various data such as image data and voice data.

In this example, any one of the terminal ID of the terminal 100 and the relay terminal ID of the relay terminal 600 includes any type of identification information that can be expressed by any language, character, symbol, mark, or any combination of language, character, symbol, and mark.

The data controller 19 analyzes sounds that are collected through the request terminal 100, and determines whether to start restriction processing to restrict information to be output through the terminal 100 based on the analysis result. For example, when the data controller 19 determines that any one of the collected sounds indicates that a third person other than the participants of videoconference is present. When it is determined that any one of the collected sounds indicate the presence of the third person, or when it is determined that the operation input 12 receives a user instruction for starting restriction processing, the data controller 19 performs restriction processing. In one example, the restriction processing restricts image data to be displayed through the display 140 of the terminal 100, for example, by not displaying or concealing at least a portion of the image data being output through the display 140 of the terminal 100. In another example, the restriction processing restricts voice data to be output through the speaker 122 of the terminal 100, for example, by not outputting the sounds or lowering the sound output level of the sounds. Further, the data controller 19 causes the terminal 100 to send a message indicating that the restriction processing is being performed on the terminal 100, to the counterpart terminal 100. On the other hand, when the data transmit/receive 11 of the request terminal 100 receives a message indicating that the restriction processing is being performed on the counterpart terminal 100 from the counterpart terminal 100, the data controller 19 causes the display 140 to display a screen based on the received message or the speaker 122 to output a sound based on the received message.

Still referring to FIG. 4, the data controller 19 includes a voice analyzer 19a, a determiner 19b, a restrictor 19c, and a state manager 19d.

The voice analyzer 19a analyzes sounds that are collected by the microphone 121 and input through the voice input 15a to obtain a characteristics value of the input sounds. The voice analyzer 19a compares the characteristics value of the input sounds with one or more sound models that are previously stored to generate a comparison result indicating whether any of the input sounds matches any one of predetermined sounds. For example, the voice analyzer 19a compares the input sound with the voice of any one of participants who are currently participating videoconference to output a comparison result. In another example, the voice analyzer 19a compares the input sound with a specific sound that is previously determined as a sound that is most likely to be generated when the third person is present to output a comparison result.

The determiner 19b determines whether restriction processing is to be applied based on the comparison result output by the voice analyzer 19a. For example, when the comparison result of the voice analyzer 19a indicates that any one of the collected sounds does not match the voice of the participant, the determiner 19b determines that restriction processing is to be applied. In another example, when the comparison result of the voice analyzer 19a indicates that any one o the collected sounds matches the specific sound that is most likely to be generated by the third person, the determiner 19b determines that restriction processing is to be applied. Alternatively, the determiner 19b determines that restriction processing is to be applied when the user instruction for applying restriction processing is received through the operation input 12. In this example, the restriction processing includes processing to restrict image data to be displayed through the display 140 of the terminal 100, and voice data to be output through the speaker 122 of the terminal 100.

The restrictor 19c applies restriction processing to the image data and/or the voice data, when the determiner 19b determines that restriction processing is to be applied to information received from the counterpart terminal 100 such as the image data and/or the voice data. In another example, the restrictor 19c cancels or stops application of restriction processing to information received from the counterpart terminal 100 such as the image data and/or the voice data, when the determiner 19b determines that restriction processing is to be cancelled or stopped.

The state manager 19d manages the operation state of the terminal 100, which indicates whether the terminal 100 is applied with the restriction processing or not. More specifically, when the state manager 19d detects that the request terminal 100 is in the restriction state, the state manager 19d sends notification to the counterpart terminal 100 that the restriction processing is being applied to the request terminal 100. In another example, assuming that the counterpart terminal 100 is in the restriction state, the state manager 19d of the request terminal 100 receives notification from the counterpart terminal 100 that the restriction processing is being applied to the counterpart terminal 100, and displays a message through the display 140 based on the notification received from the counterpart terminal 100 and/or outputs a sound through the speaker 122 based on the notification received from the counterpart terminal 100.

In this example, the memory 1000 stores therein various data including a plurality of sound models that may be used by the data controller 19 for data analysis. Further, the display control 14b controls various data to be displayed through the display 140 according to an instruction received from the state manager 19d.

Referring now to FIGS. 4 to 11, operation of the data controller 19 is explained in more details, according to an example embodiment of the present invention.

Now, operations of the determiner 19b and the restrictor 19c are explained. When the determiner 19b receives, from the voice analyzer 19a, an analysis result indicating that the third person is most likely to be present based on comparison between the input sounds and one or more sound models stored in the memory 1000, the determiner 19b determines that restriction processing is to be applied to image data and/or voice data received from the counterpart terminal 100.

The restrictor 19c restricts output of information received from the counterpart terminal 100, through the request terminal 100. In one example, the restrictor 19c causes the display control 14b of the request terminal 100 to switch the screen of the display 140 from the on-state to the off-state. For example, assuming that the terminal 100 operates under Windows operating system, an instruction for switching off the screen may be preprogrammed with respect to one of the function keys such as F3 key or one of the keys in the keyboard. In such case, the restrictor 19c outputs an instruction for switching off the screen, which is the same as the instruction for switching off the screen that would be output by the operation input 12 at the time the user selects the one of the functions keys or the one of the keys in the keyboard. Upon receiving the instruction for switching off the screen, the CPU 111 of the request terminal 100 interrupts the current process to perform operation according to the instruction for switching off the screen.

Additionally or alternatively, the restrictor 19c causes the voice output 15b to obtain information regarding the current sound output level of the speaker 122, and lower the sound output level of the speaker 122. The information regarding the current sound output level is stored in the memory 1000. For example, assuming that the terminal 100 operates under Windows operating system, the CPU 111 may use the function of audio mixer API to lower the sound output level. In such case, the sound output level may be lowered to the minimum level of zero.

In alternative to making determination based on the analysis result output by the voice analyzer 19a, the determiner 19b may determine to restrict output of information received from the counterpart terminal 100 when it is determined that the operation input 12 receives a user instruction for applying restriction processing from the user at the terminal 100. For example, the user at the terminal 100 may input the user instruction for applying restriction processing through the operation button 117. Based on the user instruction for applying restriction processing, the determiner 19b determines that restriction processing is to be applied to restrict output of information received from the counterpart terminal 100.

Further, the determiner 19b may receive a user instruction for stopping application of restriction processing through the operation input 12, and determines that restriction processing is to be stopped. The user instruction for stopping application of restriction processing may be input by the user at the terminal 100 through the operation button 117. In such case, the terminal 100 may require the user at the terminal 100 to input a password before accepting the user instruction for stopping application of restriction processing. The operation input 12 sends the password input by the user in addition to the user instruction for stopping application of restriction processing. The determiner 19b compares the password input by the user with a password that is previously stored, and determines to stop application of restriction processing when the password input by the user matches the password that is previously determined. When the password input by the user does not match the previously stored password, the determiner 19b may cause the terminal 100 to notify the user that cancellation of restriction processing is not allowed.

When the restrictor 19c receives an instruction for stopping application of restriction processing from the determiner 19b, the restrictor 19c causes the display control 14b to switch the screen from the off-state to the on-state. Alternatively or additionally, the restrictor 19c causes the voice output 15b to change the sound output level from the lowered level to the previous level. More specifically, the restrictor 19c refers to the sound output level that is previously stored in the memory 1000 at the time when restriction application is applied, and increases the volume of the speaker 122 to the sound output level that is obtained from the memory 100.

Now, operation of the state manager 19d is explained. When the restrictor 19c applies restriction processing based on the determination made by the determiner 19b, the state manager 19d generates a message indicating that restriction processing is being applied at the terminal 100, and causes the data transmit/receive 11 to send the message to the counterpart terminal 100.

More specifically, as illustrated in FIG. 5A, the state manager 19d generates an Extensible Markup Language (XML)-based message in compliance with Extensible Messaging and Presence Protocol: Instant Messaging and Presence (XMPP IM) defined by RFC3921.

In such case, the state manager 19d specifies the "from" property of the presence tag with the identification information of the request terminal 100, and the "to" property of the presence tag with the identification information of the counterpart terminal 100. In the message illustrated in FIG. 5A, "ID1" is the identification information of the request terminal 100, and "ID4" is the identification information of the counterpart terminal 100.

The state manager 19d specifies the property of the show tag with "CHAT" indicating that the terminal 100 is having videoconference with the counterpart terminal 100.

The state manager 19d specifies the property of the status tag with "DISPLAY OFF" indicating that the screen of the request terminal 100 is in the off state.

The state manager 19d instructs the data transmit/receive 11 to transmit the XML-based message of FIG. 5A to the counterpart terminal 100. The data transmit/receive 11 sends the message using XMPP.

In another example, when the restrictor 19c stops application of restriction processing based on the determination made by the determiner 19b, the state manager 19d generates a message indicating that restriction processing is not applied at the terminal 100, and causes the data transmit/receive 11 to send the message to the counterpart terminal 100.

More specifically, as illustrated in FIG. 5B, the state manager 19*d* generates an XML-based message indicating the current state of the counterpart terminal 100. The state manager 19*d* specifies the "from" property of the presence tag with the identification information of the request terminal 100 such as "ID1", and the "to" property of the presence tag with the identification information of the counterpart terminal 100 such as "ID4".

The state manager 19*d* specifies the property of the show tag with "CHAT" indicating that the terminal 100 is having videoconference with the counterpart terminal 100.

The state manager 19*d* specifies the property of the status tag with "DISPLAY ON" indicating that the screen of the request terminal 100 is in the on state.

In any one of the example messages illustrated in FIGS. 5A and 5B, the property of the status tag has either the "DISPLAY OFF" indicating that the screen is in the off state, or the "DISPLAY ON" indicating that the screen is in the on state. In this example, the status tag having the "DISPLAY OFF" further indicates that the sound output level of the speaker 122 is lowered, and the status tag having the "DISPLAY ON" further indicates that the sound output level of the speaker 122 is returned to the previous level. Alternatively, the additional tag may be included in the message of FIG. 5A or 5B that specifically indicates the current sound output level of the speaker 122. Alternatively, the status tag may additionally indicates any other state of the terminal 100 that indicates whether the terminal 100 is being applied with restriction processing.

The message transmitted by the request terminal 100 is received at the data transmit/receive 11 of the counterpart terminal 100. The state manager 19*c* of the counterpart terminal 100 analyzes the message received by the data transmit/receive 11 as follows.

The state manager 19*c* obtains the identification information "ID1" of the request terminal 100 from the "from" property of the presence tag, and the current state of the request terminal 100 from the status tag.

When the state manager 19*d* determines that the request terminal 100 has the "DISPLAY OFF" state, which indicates that restriction processing is being applied at the request terminal 100, the state manager 19*d* causes the display control 14*b* to display a screen indicating that videoconference with the request terminal 100 is interrupted.

Figure 6:
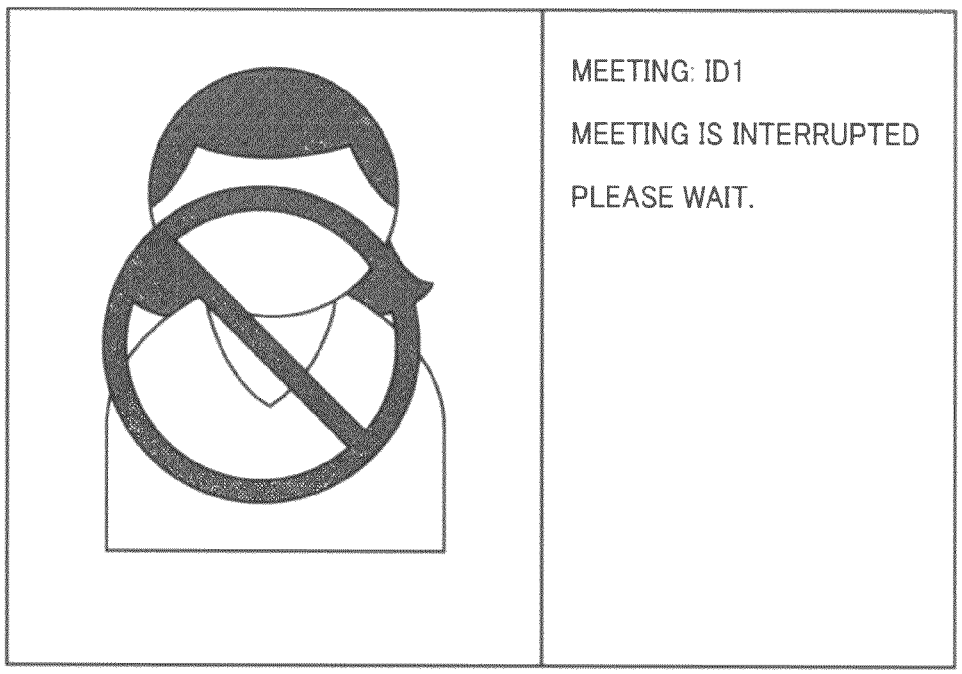
FIG. 6 is an example screen displayed by the terminal of FIG. 1 when the terminal of FIG. 1 receives a message reporting that communication is interrupted.

For example, the display control 14*b* may display a screen illustrated in FIG. 6 on the display 140. Referring to FIG. 6, the display 140 displays a mark indicating that videoconference with the request terminal 100 having the ID1 is interrupted, which is superimposed over the image showing the user at the request terminal 100. The screen of FIG. 6 further includes a text at the right side of the image indicating that videoconference is interrupted.

Figure 7:
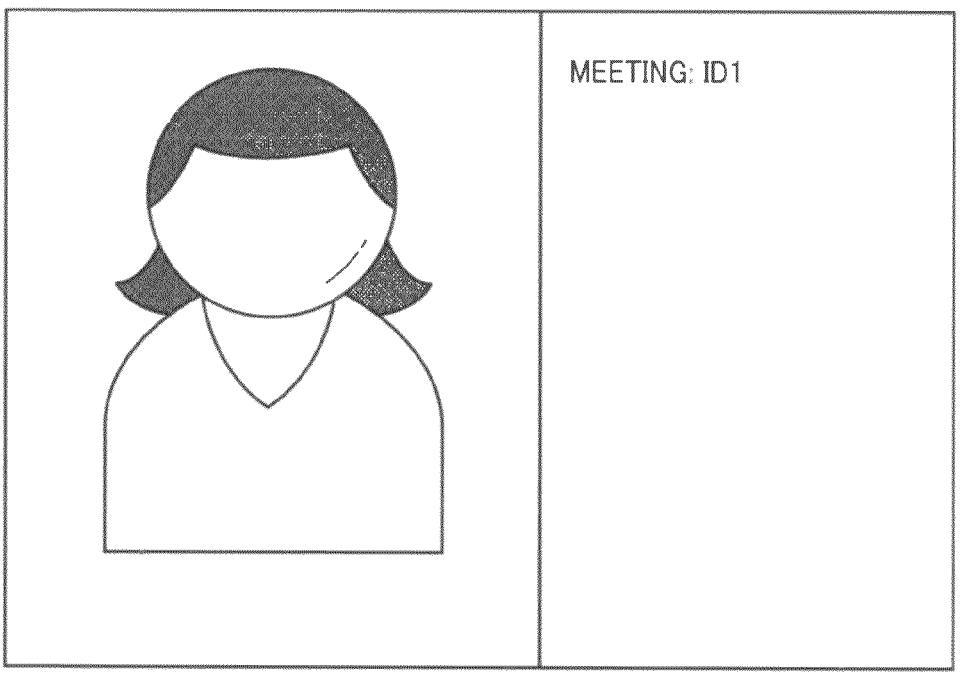
FIG. 7 is an example screen displayed by the terminal of FIG. 1 when the terminal of FIG. 1 receives a message reporting that communication is resumed.

On the other hand, when the state manager 19*d* determines that the request terminal 100 has the "DISPLAY ON" state, which indicates that restriction processing is not applied at the request terminal 100, the state manager 19*d* causes the display control 14*b* to display a screen indicating that videoconference with the request terminal 100 is being performed. For example, when the state manager 19*d* determines that application of restriction processing is stopped at the request terminal 100, the state manager 19*d* causes the display control 14*b* to switch the screen of FIG. 6 being displayed on the display 140 to a screen of FIG. 7. Referring to FIG. 7, the mark of FIG. 6 is not displayed such that the image of the user at the request terminal 100 is not concealed. Further, the text indicating that videoconference is interrupted is not displayed.

In the above-described example, the request terminal 100 and the counterpart terminal 100 exchange messages with each other through the communication network 900. Alternatively, the request terminal 100 and the counterpart terminal 100 may exchange messages with each other via the communication management system 700. Alternatively, the request terminal 100 and the counterpart terminal 100 may additionally send messages to the communication management system 700, in addition to exchanging messages with each other.

For example, when the request terminal 100 starts applying restriction processing, the data transmit/receive 11 of the request terminal 100 sends information indicating that the request terminal 100 is in the restriction state to the communication management system 700. The communication management system 700 may store information indicating that the request terminal 100 is in the restriction state, and sends notification to the counterpart terminal 100 to notify that the request terminal 100 is in the restriction state. Since the communication management system 700 manages the state of the request terminal 100, the communication management system 700 is able to send notification to any terminal 100 requesting the communication management system 700 to send information regarding the current state of the request terminal 100.

Now, operation of the voice analyzer 19*a* is explained. The voice analyzer 19*a* includes a function of converting a sound signal from analog to digital, a function of analyzing the sound signal, a function of detecting a range in the sound signal, and a function of recognizing the sound based on the detected range.

The function of converting a sound signal from analog to digital is performed as follows. The voice analyzer 19*a* is input with the analog sound signal, which is collected by the microphone 121, and converts the sound signal from analog to digital using an analog-to-digital (AD) converter. For example, the sound signal is converted to the 8 kHz, 16-bit digital signal. This conversion process is performed at the voice I/O I/F 123 of FIG. 2. More specifically, in this example, the voice input 15*a* performs analog-to-digital conversion on the collected sounds using the voice I/O I/F 123. While the purpose of this conversion process differs from the purpose of conversion process required by the voice analyzer 19*a*, the voice I/O I/F 123 is designed to perform analog-to-digital conversion, which is common to the conversion process required for the voice input 15*a* and the conversion process required for the voice analyzer 19*a*. Alternatively, these conversion processes may be performed differently from each other.

The function of analyzing the sound signal is performed as follows. In one example, the sound signal, such as the voice signal, may be analyzed using linear predictive coding (LPC). LPC removes the short frequency components from the voice signal called formants, and estimates the intensity and frequency of the remaining portion of the voice signal. Since the digital signal of the voice changes with time, LPC analysis is performed on short fragments of the voice signal, which may be referred to as frames.

LPC predicts the formants from the voice signal using the linear equation, or the prediction coefficients, that characterize the formants. The prediction coefficients may be obtained as follows.

The sound signal, which is output in the waveform, is passed through a high frequency emphasis filter. The resultant signal is split into 256 frames using a Hamming window, with the length of 16 ms. Application of window functions may suppress negative influences due to discontinuity between the frames.

For each frame, the features are extracted by LPC, with the LPC order of 20. The LPC coefficients that minimize the power sum of the predictable error of the signal for each frame are obtained. Using a recursive relation, the first to tenth cepstral coefficients are obtained from the predictable errors and the LPC coefficients. The cepstral coefficients are further converted to mel-cepstral coefficients using the Oppenheim recursion formula. The logarithmic power, which may be used as additional characteristics information of the frame, may be calculated in the process of calculating cepstral coefficients or mel-cepstral coefficients. Further, the first-order differential equation with respect to time may be calculated based on the logarithmic power.

In alternative to LPC, any desired analysis may be used such as fast Fourier transform (FFT).

The function of detecting the range is performed to determine a range in the voice signal converted by the AD converter. For example, the voice analyzer 19a observes and analyzes the logarithmic power or the first order autocorrelation function derived through the sound signal analysis to detect a range for processing. The autocorrelation describes the correlation between values of the process at different points in time.

When the range is detected, the features of the detected range such as the mel-cepstral coefficients or the logarithmic power for the detected range is obtained for further processing. When the range is not detected, the voice analyzer 19a proceeds to repeat the function of analyzing the sound signal and the function of detecting the range until the range is detected.

With this function of detecting the range for further processing, the function of recognizing the sound is performed with improved accuracy. When the sound model to be used for sound recognition is well trained such that the recognition accuracy is relatively high, the function of detecting the range may not be performed.

The function of recognizing the sound determines whether the features of the detected range matches a sound model representing the features of the sounds. For example, the voice analyzer 19a may use a HMM or GMM.

More specifically, in this example, the voice analyzer 19a is provided with a voice sound model of each user who is participating videoconference, and a noise sound model representing the noise that is most likely to be caused by a third person when the third person is present.

FIG. 8 illustrates a data structure of a voice sound model table, which is stored in the memory 1000 for reference by the voice analyzer 19a. The voice sound model table of FIG. 8 includes the total "n" of Hidden Markov Models (HMMs), each corresponding to a user who is registered as a user of the terminal 100. In alternative to HMM, Gaussian Mixture Models may be used. For example, at the time of registering the user, the terminal 100 may request the user to record his/her voice, and generate the voice sound model for storage in the voice sound mode table of FIG. 8.

FIG. 9 illustrates a data structure of a noise sound model table, which is stored in the memory 1000 for reference by the voice analyzer 19a. The noise sound model table of FIG. 9 includes the total "m" of HMMs, each corresponding to a specific sound that is previously registered as the noise that may be collected by the terminal 100. For example, the noise sound models of FIG. 9 include a noise model indicating the sound that is generated when a person enters the room where the terminal 100 is located, such as the sound indicating opening or closing of the door of the room. The noise sound models of FIG. 9 include a noise sound model indicating the sound that is generated when the user operates the terminal 100, such as the sound generated through the operation button 117 of the terminal 100.

In this example, the terminal 100 selects the voice sound model indicating the voice of the user who is participating videoconference from the voice sound model table of FIG. 8, and a noise sound model other than the noise sound model indicating the sound that is generated when the person enters the room from the noise sound model table of FIG. 9, as the expected sound that the terminal 100 is expected to detect during videoconference.

Further, in this example, the terminal 100 selects the noise sound model indicating the sound that is generated when the person enters the room from the noise sound model table of FIG. 9, as the unexpected sound that the terminal 100 is not expected to detect during videoconference, or the expected sound that the terminal 100 is expected to detect when the third person is present.

In this example, each HMM of the voice sound model or the noise sound model represents features of the voice or the sound based on occurrence probability that is obtained through statistical analysis. More specifically, the HMM is previously trained using Baum-Welch algorithm. The train data for the voice sound model is generated based on features of the voice of each user who is registered to use the terminal 100. The train data for the noise sound model is generated based on, for example, the sound that is generated at the terminal 100 during videoconference or the sound of opening or closing of the door. The train data may be obtained through the terminal 100 or any other terminal functioning as a test apparatus. Baum-Welch algorithm is an algorithm for learning parameters that maximize the likelihood of the train data, which may be used for re-estimating HMM initial models.

The voice analyzer 19a compares the features of the detected range in the input sound signal with each HMM of the sound model selected from the tables of FIG. 8 and FIG. 9, for example, using Viterbi algorithm to obtain the score that corresponds to each HMM of the selected voice sound model and the noise sound model. Viteribi algorithm is an algorithm that obtains the optimum state series and the likelihood using a specific model, and is explained in L. Rabiner and B. H. Juang, Fundamentals of Speech Recognition, NTT Advance Technology, 1995, pp. 124-129, which is hereby incorporated by reference herein.

Referring to FIGS. 8 and 9, the "i" of Si or Ni indicates a number for identifying each HMM, such that i ranges from 1, 2, . . . to n for the voice sound model, and from 1, 2, . . . to m for the noise sound model. In alternative to Viterbi algorithm, the voice analyzer 19a may use any desired algorithm such as forward algorithm.

The scores Si are compared with one another to obtain the HMM having the highest score for each of the voice sound models and the noise sound models, using the following equation.

$$I = \mathrm{argmax}(i)Si, \text{ wherein } i=1 \text{ to n for the voice sound model, and } 1 \text{ to } m \text{ for the noise sound model}.$$

In this example, the score Si of the voice sound model and the score Si of the noise sound model are respectively compared with a threshold value Ti for the voice sound model and a threshold value Ti for the noise sound model. For example, when the score Si of the voice or noise sound model with the number i is greater than a threshold value Ti, that is, Si>Ti, it is determined that the score Si has a valid value. In this example, the threshold value is set for each of the models. Alternatively, only one threshold value may be used for all voice and sound models. Alternatively, one threshold value may be used for all voice models, and one threshold value may be used for all sound models. Using the threshold, the specific HMM, which is the voice sound model or the noise sound model, having the valid score is specified.

When the HMM having the valid score is the voice sound model, the voice analyzer 19a determines that the input voice is the voice of the registered user having videoconference. When the HMM having the valid score is the noise sound model, and matches a specific noise model indicating the sound that is generated when a person enters the room where the terminal 100 is located, the voice analyzer 19a determines that a person other than the user having videoconference enters the room. When the HMM having the valid score is the noise sound model, and does not match the specific noise model indicating the sound that is generated when a person enters the room, the voice analyzer 19a determines that the input sound is noise.

When none of the HMMs selected from the tables of FIGS. 8 and 9 has a valid score, the voice analyzer 19a determines that the input voice corresponds to the voice of a person other than the current user of the terminal 100.

Each HMM of FIGS. 8 and 9 stored in the memory 1000 corresponds to the voice of each user or a specific sound. Alternatively, the HMMs that respectively represent the voices of registered users may be combined with specific sounds such as noise to generate encoded HMM. In such case, the encoded HMM may be assigned with a state indicating the voice of a specific user, and a state indicating a specific sound. For example, in such case, the memory 100 may store a voice sound model table of FIG. 10 and a noise sound model table of FIG. 11.

The voice sound model table of FIG. 10 stores a probability density function indicating the voice of a specific user, as the HMM having the total number of n states. The noise sound model table of FIG. 11 stores a probability density function indicating a specific sound such as a specific noise, as the HMM having the total number of m states.

Using the probability density functions of FIGS. 10 and 11, the voice analyzer 19a obtains the probability in which the extracted features of the frame can be observed. Further, in this example, the memory 1000 stores the transition probability $a_{Sji}$ (i=1, . . . , n), $a_{Nji}$ (i=1, . . . m) of HMM for each of voice sound model and noise sound model as a parameter of HMM.

Further, the voice analyzer 19a compares the features of the detected range with the HMM of FIGS. 10 and 11, using Viterbi algorithm, to obtain the score Ss that corresponds to the voice sound model of FIG. 10, and the score Sb that corresponds to the noise sound model of FIG. 11. Using the following equations, the voice analyzer 19a determines the score Ss having a value greater than a threshold value Ts is valid, and the score Sb having a value greater than a threshold value Tb is valid.

$Ss>Ts$, if $Ss>Sb$ $Sb>Tb$, else.

In the above-described equations, Ts and Tb respectively represent a threshold value for the voice sound model, and a threshold value for the noise sound model. In this example, a threshold value is set for each of voice sound model and noise sound model. Alternatively, one threshold value may be set for all sound models.

The function of recognizing the sound may be performed as follows. When the voice sound model having the valid score corresponds to the voice of a specific user having videoconference, the voice analyzer 19a determines that the input voice corresponds to the voice of the registered user having videoconference. On the other hand, when the noise sound model having the valid score corresponds to a specific sound, the voice analyzer 19a performs trace back processing using Viterbi algorithm to obtain a state series of noise HMM that corresponds to the frame in which the features is detected.

Based on the state series, a state number that is most likely to retain for a long period of time is identified. For example, assuming that the state series is 113333324, the state number of 3 is obtained. When this status number indicates a specific sound that is generated when a person enters the room, the voice analyzer 19a determines that the input sound indicates that the person enters the room.

When the state number, which is extracted from the state series, is a number other than the specific number indicating the specific sound that is generated when the person enters the room, the voice analyzer 19a determines that the input sound is noise.

When none of the scores of sound models has a valid score, the voice analyzer 19a determines that the input voice corresponds to the voice of a person other than the current user of the terminal 100.

In the above-described example, the voice analyzer 19a uses HMM as sound model. Alternatively, any other desired model may be used. For example, the voice analyzer 19a may use the standard pattern obtained by calculating the arithmetic average of features of several frames, applying neural network, or applying Duration-based State Transition (DST) model. DST model is described in Tetsuya MUROI and Masahide YONEYAMA, Isolated Spoken Word Recognition by Duration Based State Transition Model, The Institute of Electronics, Information and Communication Engineers, Vol. J72-D-II, No. 11, 1989, pp. 1769-1777, which is incorporated by reference herein.

When compared with HMM, DST model explicitly represents a time structure of voice patterns of the user such that it is more effective in terms of recognizing the specific user. When only a limited number of users are participating videoconference, DST model may be used in alternative to HMM to improve the accuracy in recognizing the input sounds.

Figure 12:
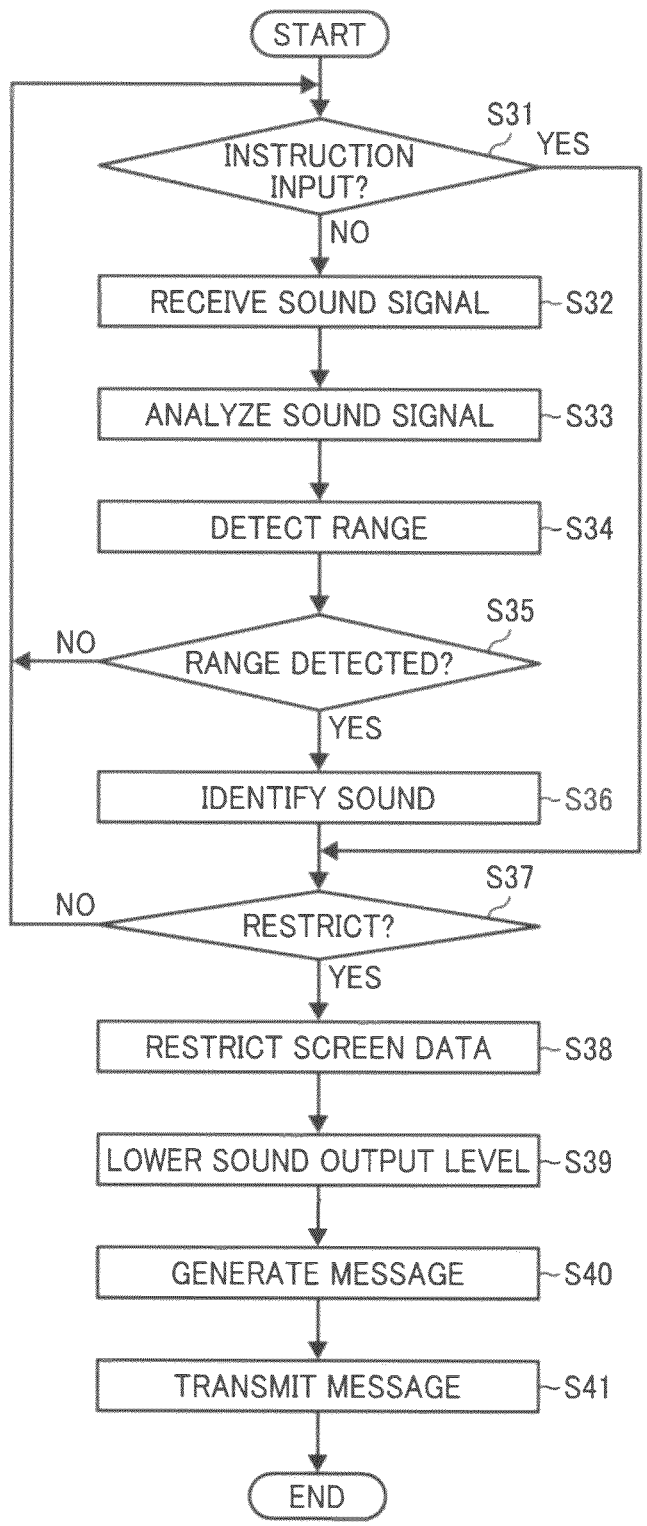
FIG. 12 is a flowchart illustrating operation of restricting output of information through the terminal of FIG. 1.

Next, operation of applying restriction processing to restrict information to be output during videoconference, performed by the terminal 100, is explained according to an example embodiment of the present invention. The operation of FIG. 12 is performed by the data controller 19 of the request terminal 100, when the request terminal 100 is having videoconference with the counterpart terminal 10.

At S31, the data controller 19 determines whether a user instruction is received through the operation input 12. When it is determined that the user instruction is received ("YES" at S31), the operation proceeds to S37.

At S37, the determiner 19b determines whether the restriction processing is to be applied based on the user instruction. More specifically, when the user instruction indicates that restriction processing is to be applied, the determiner 19b determines that the restriction processing is to be applied. When the user instruction does not indicate that restriction processing is to be applied, the determiner 19b determines that the restriction processing is not to be applied.

When it is determined that the user instruction is not received ("NO" at S31), the operation proceeds to S32 to perform voice analysis.

At S32, the analyzer 19a obtains the sound signal that is generated based on the sounds collected through the microphone 121, and converts the sound signal from analog to digital using the AD converter. In this example, the 8 kHz 16-bit sound signal is obtained.

Further, in this example, AD conversion is performed on the digital sound signal continuously while the microphone 121 are collecting sounds. The converted digital sound signal is output to the bus 126.

At S33, the voice analyzer 19a analyzes the digital sound signal obtained at S32. The voice analyzer 19a analyzes the digital sound signal, frame by frame, while the digital sound signal is being output. For example, the voice analyzer 19a generates the analysis result, which indicates features of each frame that may be expressed in terms of mel-cepstral coefficients or logarithmic power, and outputs the analysis result to the bus line 126.

At S34, the voice analyzer 19a detects a range to be processed from the digital sound signal. This range detection is performed on the digital sound signal continuously while the digital sound signal is being output.

At S35, the voice analyzer 19a determines whether any range is detected in the sound signal at S34. When it is determined that the range is detected ("YES" at S35), the operation proceeds to S36. When it is determined that no range is detected ("NO" at S35), the operation returns to S31.

At S36, the voice analyzer 19a identifies the sound from the detected range of the sound signal. More specifically, the voice analyzer 19a determines whether the features extracted from the detected range of the sound signal matches the voice of the user who is participating videoconference at the terminal 100. Further, the voice analyzer 19a determines whether the features extracted from the detected range of the sound signal matches any one of a specific sound that is most likely to be generated when a person enters the room where the terminal 100 is located.

At S37, the determiner 19b determines whether the restriction processing is to be applied to restrict information to be output through the terminal 100, based on the result of the voice analyzer 19a obtained at S36. For example, when the result of the voice analyzer 19a output at S36 indicates that the input sound signal includes a voice sound signal that does not match the voice of the user who is participating videoconference, the determiner 19b determines that there is a person other than the participants of videoconference, and determines to apply restriction processing. In another example, when the result of the voice analyzer 19a output at S36 indicates that the input sound signal includes a noise sound signal that matches the sound that is most likely to be generated when a person enters the room where the terminal 100 is located such as the sound of opening or closing of the door, the determiner 19b determines that there is a person other than the participants of videoconference, and determines to apply restriction processing.

When the determiner 19b determines that restriction processing is to be applied at S37 ("YES" at S37), the operation proceeds to S38. When the determiner 19b determines that restriction processing is not to be applied at S37 ("NO" at S37), the operation returns to S31.

At S38, the restrictor 19b instructs the display control 14b to restrict contents of information to be displayed through the display 140. For example, the display control 14b may cause the display 140 to turn off the screen of the display 140. In another example, the display control 14b may cause the display 140 to conceal a portion of image data being displayed on the screen of the display 140, for example, by superimposing at least a portion of image data being displayed on the display 140 with an additional image such as a mark.

At S39, the restrictor 19c causes the voice output 15b to lower the sound output level of the speaker 122, for example, to the minimum level. At this time, the voice output 15b obtains the current output level of the speaker 122, and stores the current output level in the memory 1000.

At S40, the state manager 19d generates a message indicating that restriction processing is being applied at the terminal 100, such as the message illustrated in FIG. 5A.

At S41, the state manager 19d causes the data transmit/receive 11 of the terminal 100 to send the message generated at S40 to the counterpart terminal 100, and the operation ends.

The operation of FIG. 12 may be performed in various other ways. For example, the operation of FIG. 12 may not be performed when the data controller 19 of the terminal 100 is applying restriction processing to restrict information to be output at the terminal 100. In such case, the operation of FIG. 12 is additionally provided with the step of determining whether any restriction processing is being applied, which may be performed by the state manager 19d before S31. When it is determined that restriction processing is being applied, the operation ends such that S31 to S41 does not have to be performed. When it is determined that restriction processing is not being applied, the operation proceeds to S31 to perform operation of FIG. 12.

Figure 13:
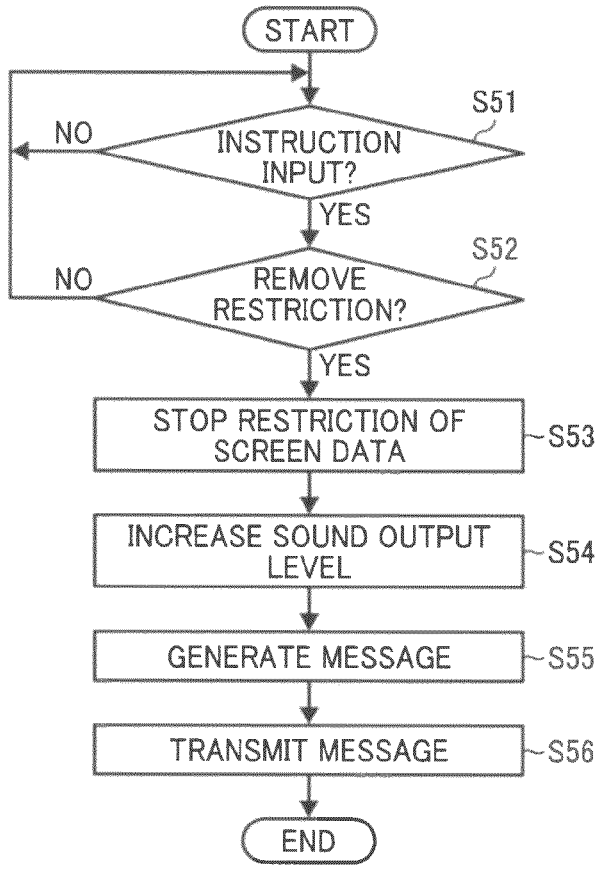
FIG. 13 is a flowchart illustrating operation of stopping the process of restricting output of information.

Referring now to FIG. 13, operation of stopping application of restriction processing, performed by the terminal 100, is explained according to an example embodiment of the present invention. The operation of FIG. 13 is performed by the data controller 19 of the request terminal 100, when the data controller 19 is applying restriction processing to information to be output through the request terminal 100.

At S51, the data controller 19 determines whether a user instruction is received through the operation input 12. When it is determined that the user instruction is received ("YES" at S51), the operation proceeds to S52. When it is determined that the user instruction is not received ("NO" at S51), the operation repeats S51.

At S52, the determiner 19b determines whether the user instruction received at the operation input 12 is a user instruction for stopping application of restriction processing. When it is determined that the user instruction indicates that restriction processing is to be stopped ("YES" at S52), the operation proceeds to S53. When it is determined that the user instruction is not a user instruction for stopping application of restriction processing ("NO" at S52), the operation returns to S51. Alternatively or additionally, at S52, the determiner 19b may determine whether the user instruction received at the operation input 12 includes valid data that is required for canceling restriction processing, such as a password of the user at the terminal 100.

At S53, the restrictor 19c instructs the display control 14b to display information received from the counterpart terminal 100 through the display 140. For example, the display control 14b may instruct the display 140 to turn on the screen to display information received from the counterpart terminal 100, when the display 140 turns off the screen due to restriction processing. In another example, the display control 14b may stop displaying the display of restriction data, such as the mark, that is displayed to conceal at least a portion of image data being displayed through the display 140.

At S54, the restrictor 19c instructs the voice output 15b to increase the sound output level of the speaker 122 to the level that is previously stored in the memory 1000 at the time when restriction processing is applied.

At S55, the state manager 19d generates a message indicating that restriction processing is not applied at the terminal 100, such as the message illustrated in FIG. 5B.

At S56, the state manager 19d causes the data transmit/receive 11 of the terminal 100 to send the message generated at S55 to the counterpart terminal 100, and the operation ends.

Figure 14:
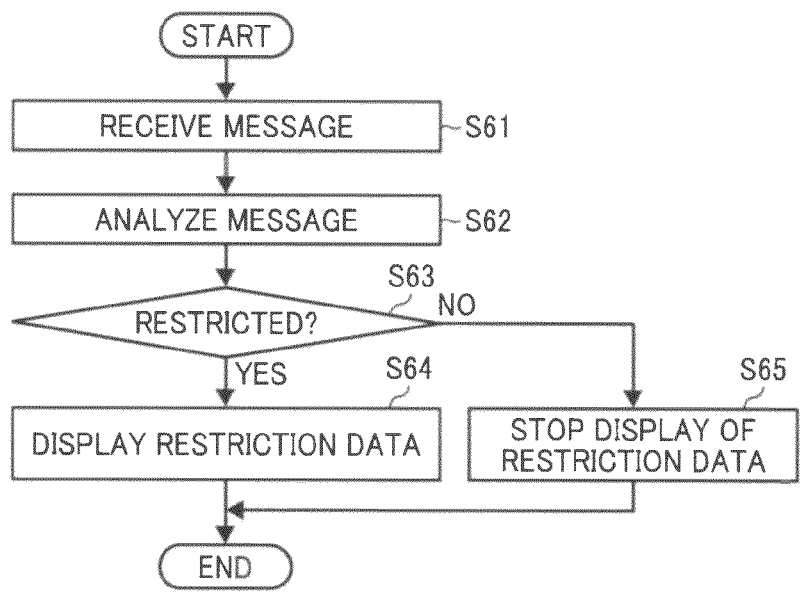
FIG. 14 is a flowchart illustrating operation of controlling output of information at the terminal of FIG. 1, when the terminal of FIG. 1 receives a message reporting that the processing of restricting output of information is started or stopped at a counterpart terminal having videoconference with the terminal of FIG. 1.

Referring now to FIG. 14, operation of processing image data to be displayed based on a message received from the request terminal 100, performed by the counterpart terminal 100, is explained according to an example embodiment of the present invention. The operation of FIG. 14 is performed by the counterpart terminal 100 when the counterpart terminal 100 receives the message from the request terminal 100.

At S61, the data transmit/receive 11 of the counterpart terminal 100 receives a message from the request terminal 100. In this example, it is assumed that the data transmit/receive 11 of the counterpart terminal 100 receives a message indicating that restriction processing is performed on the request terminal 100 such as the message of FIG. 5A, or a message indicating that restriction processing is not performed on the request terminal 100 such as the message of FIG. 5B.

At S62, the state manager 19d of the counterpart terminal 100 analyzes the message received from the request terminal 100.

At S63, the state manager 19d determines whether the analysis result of S62 indicates that restriction processing is applied at the terminal 100. When it is determined that restriction processing is applied at the terminal 100 ("YES" at S63), the operation proceeds to S64. When it is determined that restriction processing is not applied at the terminal 100 ("NO" at S63), the operation proceeds to S65.

More specifically, when the message received at S61 is a message indicating that restriction processing is applied at the terminal 100, the state manager 19d determines that restriction processing is applied at the terminal 100. For example, referring back to FIG. 5A, the state manager 19d refers to the property of the status tag to determine whether the property of the status tag has the value "DISPLAY OFF". When the property of the status tag has the value "DISPLAY OFF", the state manager 19d determines that the screen of the terminal 100 having the ID1 is in the off state and the sound output level of the speaker 122 is lowered.

When the message received at S61 is a message indicating that restriction processing is not applied at the terminal 100, the state manager 19d determines that restriction processing is not applied at the terminal 100. For example, referring back to FIG. 5B, the state manager 19d refers to the property of the status tag to determine whether the property of the status tag has the value "DISPLAY ON". When the property of the status tag has the value "DISPLAY ON", the state manager 19d determines that the screen of the terminal 100 having the ID1 is in the on state and the sound output level of the speaker 122 is returned to the previous level.

At S64, the state manager 19d instructs the display control 14b to display restriction data, such as the mark and/or text of FIG. 6, through the display 140. For example, as illustrated in FIG. 6, the display control 14b may cause the display 140 to display the mark and/or text to notify the user at the counterpart terminal 100 that videoconference with the request terminal 100 is being interrupted, and the operation ends.

At S65, the state manager 19d instructs the display control 14b to stop the display of restriction data, such as the mark and/or text, through the display 140. For example, as illustrated in FIG. 7, the display control 14b may cause the display 140 to stop displaying the mark and/or text indicating that videoconference with the request terminal 100 is being interrupted, and the operation ends.

In the above-described example, when the terminal 100 is having videoconference with one or more terminals 100, the terminal 100 collects sounds through the terminal 100, which is generated at the place where the terminal 100 is located. The terminal 100 determines whether any one of the sounds indicates that a person other than the participants of videoconference is present at the place where the terminal 100 is located. For example, the terminal 100 determines whether the input voice sound matches the voice of any of the users who are participating the videoconference to generate a determination result. Alternatively or additionally, the terminal 100 determines whether the input sound matches a specific sound that is most likely to be generated when a person other than the participants enters the place where the terminal 100 is located. When the determination result indicates that the input voice sound does not match the voice of any one of the participants of videoconference, and/or when the determination result indicates that the input sound matches the specific sound that is most likely to be generated when the person other than the participants is present at the place where the terminal 100 is located, the terminal 100 performs restriction processing to restrict information to be output through the terminal 100.

For example, restriction processing includes processing to restrict information to be displayed through the display 140 of the terminal 100, and processing to restrict information to be output through the speaker 122.

In another example, the terminal 100 performs restriction processing when the terminal 100 detects a user instruction for applying restriction processing.

When the terminal 100 determines that restriction processing is to be applied, the terminal 100 further transmits a message indicating that restriction processing is being applied at the terminal 100, to the counterpart terminal 100. The counterpart terminal 100 displays information based on the received message to notify the user at the counterpart terminal 100 that restriction processing is being applied at the terminal 100.

The terminal 100 stops application of restriction processing when a user instruction for stopping application of restriction processing is input at the terminal 100. In such case, the terminal 100 stops application of restriction processing, for example, by causing the display 140 to display information received from the counterpart terminal 100 and/or causing the speaker 122 to output information received from the counterpart terminal 100. Further, the terminal 100 sends a message indicating that restriction processing is not applied at the terminal 100, to the counterpart terminal 100. The counterpart terminal 100 displays information based on the received message to notify the user at the counterpart terminal 100 that restriction processing is not being applied at the terminal 100.

In another example, the terminal 100 stops application of restriction processing when the terminal 100 determines that the sounds collected at the terminal 100 indicates that no person other than the participants videoconference is present at the place where the terminal 100 is located.

With the above-described functions, the terminal 100 suppresses leakage of information to a third party, even when a person other than the participants of videoconference is present at the terminal 100. More specifically, the terminal 100 is designed to automatically restrict information to be output through the terminal 100 based on a determination result indicating that the third party is present, thus suppressing leakage of information to the third party. This greatly reduces the workload of a user as no human intervention is required.

For example, even when the terminal 100 communicates with another terminal 100 using VPN, the terminal 100 is most likely to store various information before transmitting data to another terminal 100. In such case, the stored information, which may be confidential, may be stolen by a third person as long as the third person accesses the terminal 100. As described above, since the terminal 100 applies restriction processing to restrict output of information when the terminal 100 determines that there is a third person based on the sounds collected through the terminal 100, leakage of information to the third person is most likely to be prevented even when the third person succeeds to access the terminal 100.

Further, since the request terminal 100 sends notification to the counterpart terminal 100 that videoconference with the request terminal 100 is being interrupted, a user at the counterpart terminal 100 is able to carry out videoconference without wondering why the user at the request terminal 100 is not responding.

In the above-described examples, the counterpart terminal 100 causes the display 140 to display the text message indicating that restriction processing is being applied at the request terminal 100. Alternatively or additionally, the counterpart terminal 100 may cause the speaker 122 to output a message indicating that restriction processing is being applied at the request terminal 100. Alternatively or additionally, the counterpart terminal 100 may be additionally provided with a lighting source that is lighted up based on a message indicating that restriction processing is being applied at the request terminal 100.

In another example, the terminal 100 may cause the voice output 15b to lower the sound output level of the speaker 122, without causing the display control 14b to apply restriction processing to the display 140.

Further, in the above-described examples, the communication system of FIG. 1 is implemented as a videoconference system for use at offices or home. Other examples of use of the communication system of FIG. 1 include, but not limited to, meetings, casual conversation among family members or friends, and distribution of information in one direction.

Further, in the above-described example, the terminal 100 may be implemented as a portable phone. Further, any number of users may use one terminal 100 to communicate with one or more users at another terminal 100.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Further, any one of the above-described functions of controlling restriction processing may be provided in the form of a plurality of instructions, which may be additionally provided through firmware or software upgrade.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

For example, any one of sound models described above may be alternatively referred to as an acoustic model.

In one example, the terminal of the communication system receives conference information received from a counterpart terminal for output through the terminal, and transmits conference information to the counterpart terminal for output through the counterpart terminal. The terminal includes a determiner to determine whether restriction processing is to be applied to restrict output of the conference information received from the counterpart terminal; a restriction processor to apply restriction processing to restrict output of the conference information received from the counterpart terminal when the determiner determines that restriction processing is to be applied; and a state manager to transmit a message indicating that restriction processing is applied at the terminal to the counterpart terminal when the restriction processor applies restriction processing.

In one example, the terminal of the communication system receives conference information received from a counterpart terminal for output through the terminal, and transmits conference information to the counterpart terminal for output through the counterpart terminal. The terminal includes a first determiner to determine whether restriction processing is to be applied to restrict output of the conference information received from the counterpart terminal; an operation input to receive a user instruction for stopping application of restriction processing; a second determiner to determine whether restriction processing is to be stopped based on the user instruction; a restriction processor to apply restriction processing to restrict output of the conference information received from the counterpart terminal when the first determiner determines that restriction processing is to be applied, and to stop application of restriction processing when the second determiner determines that restriction processing is not to be applied; and a state manager to send a message indicating that restriction processing is applied at the request terminal to the counterpart terminal when restriction processing is applied, and to send a message indicating that restriction processing is not applied at the request terminal to the counterpart terminal when restriction processing is not applied.

In any one of the above-described examples, the state manager of the terminal outputs information indicating that restriction processing is applied at the counterpart terminal when the state manger receives, from the counterpart terminal, a message indicating that restriction processing is applied at the counterpart terminal.

In any one of the above-described examples, the state manager of the terminal stops outputting of information indicating that restriction processing is applied at the counterpart terminal when the state manager receives, from the counterpart terminal, a message indicating that restriction processing is not applied at the counterpart terminal.

In another example, the terminal of the communication system receives conference information received from a counterpart terminal for output through the terminal, and transmits conference information to the counterpart terminal for output through the counterpart terminal. The terminal includes a state manager to output information indicating that restriction processing is applied at the counterpart terminal through the terminal when a message indicating that restriction processing is applied at the counterpart terminal is received from the counterpart terminal, and to stop outputting of information indicating that restriction processing is applied at the counterpart terminal through the terminal when a message indicating that restriction processing is not applied at the counterpart terminal is received from the counterpart terminal.

In any one of the above-described example, the determiner or the first determiner determines whether restriction processing is to be applied based on a user instruction for applying restriction processing.

In any one of the above-described examples, the terminal further includes a voice analyzer to analyze a sound input through the terminal, and determine whether the input sound is a sound that is previously determined as a sound that is expected to be generated during videoconference or whether the input sound is a sound that is previously determined as a sound that is expected to be generated when a third person is present. When the determination result indicates that the input sound does not match the sound that is expected to be generated during videoconference or the input sound matches the sound that is previously determined as the sound that is expected to be generated when the third person is present, the terminal determines that restriction processing is to be applied to output of the information received from the counterpart terminal.

In any one of the above-described examples, the conference information includes voice information to be output through a speaker of the terminal. The restriction processing includes processing to lower an output sound level of the speaker. When the restriction processing is stopped, the output sound level of the speaker is increased from the lowered level to a previous output sound level that is stored at the time when restriction processing is applied.

In any one of the above-described examples, the conference information includes screen information to be output through a display of the terminal. The restriction processing includes processing to display information indicating that restriction processing is applied at the terminal through the display.

In another example, the terminal of the communication system receives conference information received from a counterpart terminal for output through the terminal, and transmits conference information to the counterpart terminal for output through the counterpart terminal. When it is determined that restriction processing is to be applied to output of conference information received from the counterpart terminal, the terminal applies restriction processing to restrict output of the conference information received from the counterpart terminal and sends a message indicating that restriction processing is applied at the terminal to the counterpart terminal. When it is determined that restriction processing is to be stopped, the terminal stops application of restriction processing to restrict output of conference information received from the counterpart terminal, and sends a message indicating that restriction processing is not applied at the terminal to the counterpart terminal. When the terminal receives a message indicating that restriction processing is applied at the counterpart terminal from the counterpart terminal, the terminal outputs information indicating that restriction processing is applied at the counterpart terminal through the terminal. When the terminal receives a message indicating that restriction processing is not applied at the counterpart terminal from the counterpart terminal, the terminal stops output of information indicating that restriction processing is applied at the counterpart terminal.

In another example, the present invention may reside in a recording medium storing a plurality of instructions which, when executed by a processor, cause a communication terminal to perform a method of controlling conference information received from a counterpart terminal. The method includes: receiving conference information from the counterpart terminal through a network; analyzing a sound input through the communication terminal to generate an analysis result; determining whether restriction processing is to be applied at the communication terminal based on the analysis result; and restricting output of the conference information through the communication terminal when the determiner determines that restriction processing is to be applied.

What is claimed is:

1. A communication terminal, comprising:
    a data receiver to receive conference information for a communication conference from a counterpart terminal through a network;
    an analyzer to analyze a sound input through the communication terminal to generate an analysis result;
    a determiner to determine whether a restriction on the communication conference is to be applied at the communication terminal based on whether the analysis result indicates whether there is a person present who is not a participant in the communication conference; and
    a restrictor to restrict output of the conference information through the communication terminal when the determiner determines that the restriction is to be applied.

2. The communication terminal of claim 1, further comprising:
    a state manger to generate a message indicating that the restriction is applied at the communication terminal when the determiner determines that the restriction is to be applied, and send the message to the counterpart terminal through the network.

3. The communication terminal of claim 2, further comprising:
    an operation input to receive a user instruction from a user at the communication terminal, wherein
    the determiner further determines that the restriction is to be stopped at the communication terminal when the user instruction instructs that the restriction is to be stopped, and
    the state manager further generates a message indicating that the restriction is stopped at the communication terminal when the determiner determines that the restriction is to be stopped, and sends the message to the counterpart terminal through the network.

4. The communication terminal of claim 3, further comprising:
    a display control to cause a display device to display the conference information received from the counterpart terminal, wherein
    the restrictor causes the display control to change the display of at least a portion of the conference information being displayed by the display device when the determiner determines that the restriction is to be applied.

5. The communication terminal of claim 4, further comprising:
    a sound controller to cause a speaker to output the conference information received from the counterpart terminal, wherein the restrictor causes the sound control to change the output level of the conference information when the determiner determines that the restriction is to be applied.

6. The communication terminal of claim 5, wherein:
the analyzer compares the input sound with a voice of the user at the communication terminal to generate the analysis result, and
the determiner determines that the restriction is to be applied at the communication terminal when the analysis result indicates that the input sound does not match the voice of the user at the communication terminal.

7. The communication terminal of claim 6, wherein:
the analyzer further compares the input sound with a specific sound that is expected to be generated when a third person is present at the place where the communication terminal is located, and
the determiner determines that the restriction is to be applied at the communication terminal when the analysis result indicates that the input sound matches the specific sound that is expected.

8. A communication system, comprising:
a communication terminal; and
a counterpart terminal configured to connect to the communication terminal through a network, wherein
the communication terminal includes:
  a data receiver to receive conference information from the counterpart terminal through the network;
  an analyzer to analyze a sound input through the communication terminal to generate an analysis result;
  a determiner to determine whether a restriction on the communication conference is to be applied at the communication terminal based on whether the analysis result indicates whether there is a person present who is not a participant in the communication conference;
  a restrictor to restrict output of the conference information through the communication terminal when the determiner determines that the restriction is to be applied; and
  a processor to generate a message indicating that restriction processing is applied at the communication terminal when the determiner determines that the restriction is to be applied, and send the message to the counterpart terminal through the network, and
the counterpart terminal includes:
  a processor to cause an output device to output information indicating that the restriction is applied at the communication terminal based on the message received from the communication terminal.

9. The communication system of claim 8, wherein:
the communication terminal further includes an operation input to receive a user instruction from a user at the communication terminal,
the determiner of the communication terminal further determines that the restriction is to be stopped at the communication terminal when the user instruction instructs that the restriction is to be stopped,
the processor of the communication terminal further generates a message indicating that restriction processing is stopped at the communication terminal when the determiner determines that restriction processing is to be stopped, and sends the message to the counterpart terminal through the network, and the processor of the counterpart terminal further causes the output device to stop output of the information indicating that the restriction is applied at the communication terminal based on the message received from the communication terminal.

10. The communication system of claim 9, further comprising:
a communication management system to manage information regarding the communication terminal and the counterpart terminal, wherein
the communication terminal sends the message to the counterpart terminal via the communication management system.

11. A method of controlling conference information received from a counterpart terminal, performed by a communication terminal, the method comprising:
receiving conference information for a communication conference from the counterpart terminal through a network;
analyzing a sound input through the communication terminal to generate an analysis result;
determining whether a restriction is to be applied at the communication terminal based on whether the analysis result indicates whether there is a person present who is not a participant in the communication conference; and
restricting output of the conference information through the communication terminal when the determining determines that the restriction is to be applied.

12. The method of claim 11, further comprising:
generating a message indicating that the restriction is applied at the communication terminal when the determining determines that the restriction is to be applied; and
sending the message indicating that the restriction is applied to the counterpart terminal through the network.

13. The method of claim 12, further comprising:
receiving a user instruction from a user at the communication terminal;
determining the restriction is to be stopped at the communication terminal when the user instruction instructs that the restriction is to be stopped;
generating a message indicating that the restriction is stopped at the communication terminal when the determining of whether the restriction is to be stopped determines that the restriction is to be stopped; and
sending the message indicating that the restriction is stopped to the counterpart terminal through the network.

14. The method of claim 13, further comprising:
displaying, through a display device, the conference information received from the counterpart terminal; and
changing the display of at least a portion of the conference information being displayed by the display device when the determining of whether the restriction is to be applied determines that the restriction is to be applied.

15. The method of claim 14, further comprising:
outputting, through a speaker, the conference information received from the counterpart terminal; and
changing the output level of the conference information when the determining of whether the restriction is to be applied determines that the restriction is to be applied.

* * * * *